No. 647,453. Patented Apr. 10, 1900.
C. C. SCAIFE & J. M. DAVIDSON.
FILTER BED.
(Application filed Jan. 22, 1900.)
(No Model.)

Witnesses:
F. L. Durand
W. Parker Reinohl

Inventors:
Charles C. Scaife
John M. Davidson
by D. L. Reinohl
Attorney

UNITED STATES PATENT OFFICE.

CHARLES C. SCAIFE AND JOHN M. DAVIDSON, OF ALLEGHENY, PENNSYLVANIA, ASSIGNORS TO JAMES VERNER SCAIFE, OF SAME PLACE.

FILTER-BED.

SPECIFICATION forming part of Letters Patent No. 647,453, dated April 10, 1900.

Application filed January 22, 1900. Serial No. 2,375. (No model.)

*To all whom it may concern:*

Be it known that we, CHARLES C. SCAIFE and JOHN M. DAVIDSON, citizens of the United States, residing at Allegheny, in the county of Allegheny and State of Pennsylvania, have invented certain new and useful Improvements in Filter-Beds; and we do hereby declare the following to be a full, clear, and exact description of the invention, such as will enable others skilled in the art to which it appertains to make and use the same.

Our invention relates to filters especially adapted for purifying water, has especial reference to filter-beds, and consists in certain improvements in construction, which will be fully disclosed in the following specification and claims.

Figure 1:
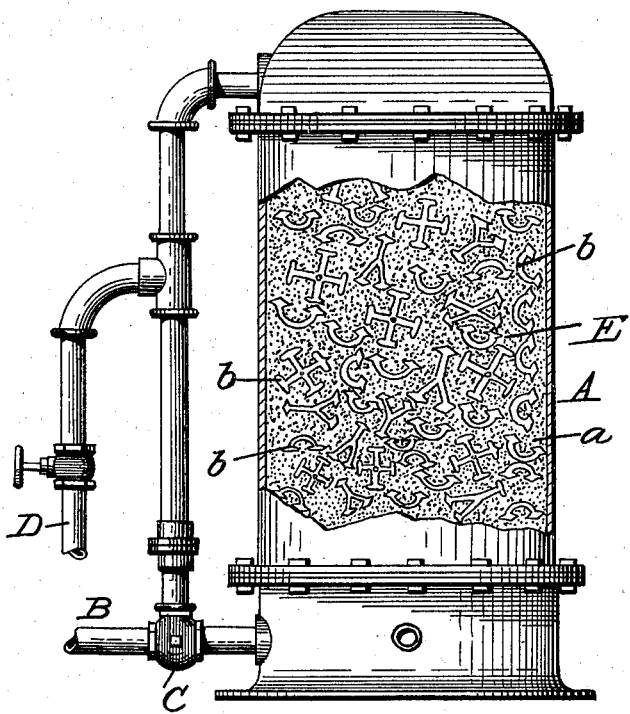
Figure 2:
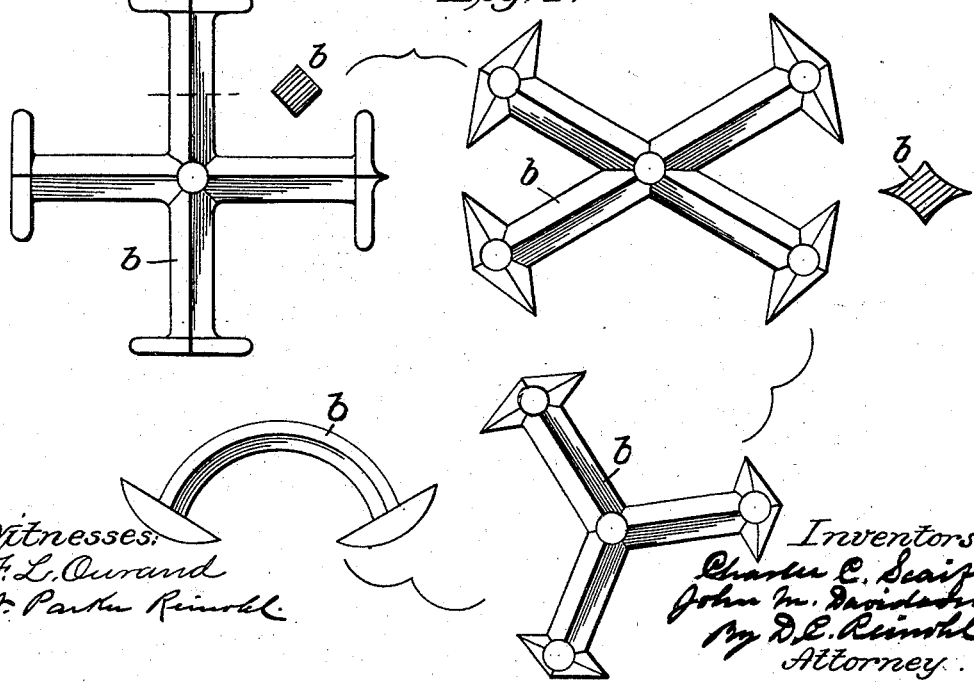

In the accompanying drawings, which form part of this specification, Figure 1 represents a side elevation of a filter, partly broken away to show the filter-bed; and Fig. 2 represents some of the different forms of the bodies in the filter-bed.

In the practical use of filters containing beds of granular material the bed becomes packed by the pressure of the water passing through the filter and the particles of the bed adhere or become cemented together by the chemicals and impurities contained in the water, so that the bed frequently forms into a mass or lumps or strata, and when the current of water is reversed to clean the filter-bed it frequently occurs that the water will rise through the bed in separate streams or courses and will leave a large part of the bed in an unpenetrated or undisturbed mass, or the water cuts its way through the bed in direct lines from the point of inlet to the point of outlet, thus again leaving a large part of the bed that is not affected by the reverse current of the water and is consequently not cleaned. To overcome this serious difficulty, various devices have been employed, such as mechanical agitators to be operated by hand; but these frequently become so solidly embedded in the packed filter-bed that they cannot be moved, and in some instances the filter-bed has had to be removed by cutting it out of the filter with a hammer and chisel or with a bar of metal. We have discovered by practical tests that the placing of bodies of burnt fire-clay or burnt clay or vitreous material of irregular form in and interspersing them through the granular bed of sand or quartz and charcoal in an altogether irregular manner and avoiding such form of the bodies and any arrangement of them in the filter-bed as will operate by the liquid passing through the filter-bed to pack said bodies and prevent the passage of liquid between them retards the adhesion or cementing of the bed in mass, lumps, or strata, as the sand will not readily adhere to the bodies, and also greatly facilitates the water in working its way through the filter-bed for cleaning it, and that the bodies are tumbled about by the pressure of the reverse current of water so violently that they break up any crusted or lumped particles, and the bed and the bodies are thoroughly cleaned by attrition.

Reference being had to the drawings and the letters thereon, A indicates the body of the filter, which may be of any approved form and is provided with the usual water-supply pipe B, three-way cock C for changing or reversing the current for cleaning the filter-bed, and the waste-pipe D, all of which may be of any approved form of construction.

E indicates the filter-bed, composed of granular material $a$—such as sand, crushed quartz, and charcoal—and through the bed are interspersed bodies $b$, irregular in form, and arranged in irregular form, so that they will not lie close together and form a compact body, preventing the passage of liquid between them in filtering, but will retard the adhesion of the particles and the forming of a mass, lumps, or strata by cementation produced by the coagulation of chemicals, lime, sulfur, iron, and the slimy matter contained in the water and break up any caked or lumped particles of the bed. The bodies $b$ may be made in various irregular forms, as shown in Fig. 2, and are preferably made of burnt fire or other clay, pieces of broken pottery-ware, or vitreous material, and for some purposes they may be made of cast-iron; but the burnt fire or other clay in the several forms shown is preferred.

To clean the filter-bed, the cock C is turned and the current of the water reversed and directed through the bottom of the filterchamber, when the water coming in contact with the bodies $b$ is deflected and cuts its way through the entire filter-bed, the granules of which become semiliquid, are agitated by the current of the water, and the bodies $b$ are tumbled about and break or disintegrate the lumps or cakes, and the sand in its agitation thoroughly scours the surfaces of the bodies, and the two are cleansed by attrition. After the cleaning of the bed the granular portion $a$ and the bodies $b$ assume their normal position by gravitation, and the bed is ready for further service.

Having thus fully described our invention, what we claim is—

1. A filter-bed composed of granular material and bodies of irregular form irregularly interspersed through the granular material, to prevent packing of said bodies in filtering, and to break up the filter-bed in cleaning the bed.

2. A filter-bed composed of granular material and free bodies of irregular form irregularly interspersed through and commingled with the granular material, to prevent packing of said bodies in filtering, and to break up the filter-bed in cleaning the bed.

3. A filter-bed composed of granular material and free bodies of burnt clay or vitreous material irregular in form and irregularly interspersed through and commingled with the granular material, to prevent packing of said bodies in filtering and to break up the filter-bed in cleaning the bed.

In testimony whereof we affix our signatures in presence of two witnesses.

CHARLES C. SCAIFE.
JOHN M. DAVIDSON.

Witnesses:
CLARENCE A. YOUNG,
HARRY S. OBERLIN.